United States Patent
Iwashita et al.

(10) Patent No.: US 12,031,023 B2
(45) Date of Patent: Jul. 9, 2024

(54) RESIN COMPOSITION AND MONOLAYER AND MULTILAYER FILMS

(71) Applicant: MITSUI CHEMICALS, INC., Tokyo (JP)

(72) Inventors: Akihiko Iwashita, Rye Brook, NY (US); Yoshiyuki Ogawa, Chiba (JP); Youhei Houtani, Shanghai (CN)

(73) Assignee: Mitsui Chemicals, Inc. (JP)

( * ) Notice: Subject to any disclaimer, the term of this patent is extended or adjusted under 35 U.S.C. 154(b) by 958 days.

(21) Appl. No.: 16/976,693

(22) PCT Filed: Feb. 8, 2019

(86) PCT No.: PCT/JP2019/004635
§ 371 (c)(1),
(2) Date: Aug. 28, 2020

(87) PCT Pub. No.: WO2019/176403
PCT Pub. Date: Sep. 19, 2019

(65) Prior Publication Data
US 2021/0002465 A1   Jan. 7, 2021

(30) Foreign Application Priority Data
Mar. 15, 2018   (JP) ................. 2018-047837

(51) Int. Cl.
| | | |
|---|---|---|
| *C08L 23/12* | (2006.01) | |
| *B29C 48/08* | (2019.01) | |
| *B65D 65/40* | (2006.01) | |
| *C09J 123/12* | (2006.01) | |
| *H01M 50/119* | (2021.01) | |
| *H01M 50/121* | (2021.01) | |
| *H01M 50/124* | (2021.01) | |
| *H01M 50/126* | (2021.01) | |
| *H01M 50/131* | (2021.01) | |
| *H01M 50/14* | (2021.01) | |
| *B29K 23/00* | (2006.01) | |
| *B29K 105/00* | (2006.01) | |

(52) U.S. Cl.
CPC ............. *C08L 23/12* (2013.01); *B29C 48/08* (2019.02); *B65D 65/40* (2013.01); *C09J 123/12* (2013.01); *H01M 50/119* (2021.01); *H01M 50/121* (2021.01); *H01M 50/124* (2021.01); *H01M 50/126* (2021.01); *H01M 50/131* (2021.01); *H01M 50/14* (2021.01); *B29K 2023/06* (2013.01); *B29K 2023/08* (2013.01); *B29K 2023/12* (2013.01); *B29K 2023/14* (2013.01); *B29K 2105/0085* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | |
|---|---|---|
| 5,695,838 A | 12/1997 | Tanaka et al. |
| 7,678,934 B2 | 3/2010 | Hirota et al. |
| 7,728,078 B2 | 6/2010 | Ikenaga et al. |
| 7,737,239 B2 | 6/2010 | Ikenaga et al. |
| 7,767,313 B2 | 8/2010 | Ikenaga et al. |
| 7,863,368 B2 | 1/2011 | Hoya |
| 8,338,697 B2 | 12/2012 | Hoya et al. |
| 8,445,582 B2 | 5/2013 | Yasui et al. |
| 8,592,674 B2 | 11/2013 | Hoya et al. |
| 8,716,418 B2 | 5/2014 | Yamamoto et al. |
| 8,946,543 B2 | 2/2015 | Hoya et al. |
| 8,962,974 B2 | 2/2015 | Hoya et al. |
| 9,217,078 B2 | 12/2015 | Hoya et al. |
| 9,908,983 B2 | 3/2018 | Hoya et al. |
| 9,963,567 B2 | 5/2018 | Hoya et al. |
| 9,969,853 B2 | 5/2018 | Hoya et al. |
| 2007/0251572 A1 | 11/2007 | Hoya et al. |
| 2008/0292896 A1 | 11/2008 | Ikenaga et al. |
| 2008/0306219 A1 | 12/2008 | Ikenaga et al. |
| 2008/0306234 A1 | 12/2008 | Ikenaga et al. |
| 2008/0312461 A1 | 12/2008 | Ikenaga et al. |
| 2009/0043050 A1 | 2/2009 | Ikenaga et al. |

(Continued)

FOREIGN PATENT DOCUMENTS

| | | |
|---|---|---|
| EP | 1 820 821 A1 | 8/2007 |
| JP | S504144 A | 1/1975 |
| JP | H04-300933 A | 10/1992 |
| JP | H06-207062 A | 7/1994 |
| JP | H09-111069 A | 4/1997 |
| JP | H09-272765 A | 10/1997 |
| JP | 2001-150614 A | 6/2001 |
| JP | 2007-273398 A | 10/2007 |
| JP | 2013-256670 A | 12/2013 |
| JP | 2015-230777 A | 12/2015 |
| KR | 10-2009-0032146 A | 3/2009 |

(Continued)

OTHER PUBLICATIONS

International Searching Authority, "International Search Report," issued in connection with International Patent Application No. PCT/JP2019/004635, dated May 7, 2019.

International Searching Authority, "Written Opinion," issued in connection with International Patent Application No. PCT/JP2019/004635, dated May 7, 2019.

*Primary Examiner* — Sheeba Ahmed
(74) *Attorney, Agent, or Firm* — Foley & Lardner LLP

(57) ABSTRACT

Resin composition comprises 35 to 59.9 parts by mass of a propylene polymer (A) satisfying below; 25 to 40 parts by mass of a soft propylene copolymer (B); 0.1 to 10 parts by mass of a polyolefin (C) containing a structural unit derived from an unsaturated carboxylic acid and/or a derivative thereof; and 15 to 30 parts by mass of an ethylene polymer (D) (provided that the total of (A), (B), (C), and (D) is 100 parts by mass), wherein an MFR measured at 230° C. and a load of 2.16 kg according to ASTM D-1238 is 7 g/10 min or more and 25 g/10 min or less, with each component satisfying certain requirements.

8 Claims, No Drawings

(56) References Cited

U.S. PATENT DOCUMENTS

| | | |
|---|---|---|
| 2010/0056691 A1 | 3/2010 | Hoya |
| 2010/0063198 A1 | 3/2010 | Yasui et al. |
| 2011/0196103 A1 | 8/2011 | Kawahara et al. |
| 2012/0283399 A1 | 11/2012 | Yamamoto et al. |
| 2013/0011596 A1* | 1/2013 | Hoya .................... B32B 25/00 525/88 |
| 2013/0011649 A1 | 1/2013 | Hoya et al. |
| 2013/0017351 A1 | 1/2013 | Hoya et al. |
| 2013/0017379 A1 | 1/2013 | Hoya et al. |
| 2016/0060407 A1 | 3/2016 | Hoya et al. |
| 2016/0060443 A1 | 3/2016 | Hoya et al. |
| 2016/0122492 A1 | 5/2016 | Hoya et al. |
| 2019/0300688 A1 | 10/2019 | Iwashita et al. |

FOREIGN PATENT DOCUMENTS

| | | |
|---|---|---|
| KR | 10-2009-0126254 A | 12/2009 |
| WO | WO-2004/087775 A1 | 10/2004 |
| WO | WO-2008/059746 A1 | 5/2008 |
| WO | WO-2011/078054 A1 | 6/2011 |
| WO | WO-2018/016460 A1 | 1/2018 |

* cited by examiner

RESIN COMPOSITION AND MONOLAYER AND MULTILAYER FILMS

RELATED APPLICATIONS

The present application claims priority under 37 U.S.C. § 371 to International Patent Application No. PCT/JP2019/004635, filed Feb. 8, 2019, which claims priority to and the benefit of Japanese Patent Application No. 2018-047837, filed on Mar. 15, 2018. The contents of these applications are hereby incorporated by reference in their entireties.

TECHNICAL FIELD

The present invention relates to resin compositions, and monolayer films and multilayer films, and more specifically relates to monolayer films and multilayer films suitably used in packaging materials for food products, construction materials, packaging materials for lithium ion batteries and the like, and a resin composition contained in these films.

BACKGROUND ART

Conventionally, polypropylene has been widely used as a thermoplastic molding material having high rigidity, heat resistance, transparency and the like. Such polypropylene is a nonpolar material, which has poor adhesiveness to a polar material such as an ethylene vinyl alcohol copolymer, leading to a desire for an improvement in adhesiveness, particularly adhesiveness at a low enthalpy. To improve the adhesiveness, a technique of modifying polypropylene with an unsaturated carboxylic acid or a derivative thereof has been widely known. Because polypropylene also has inferior flexibility, a soft rubber component is usually compounded with polypropylene when used as an adhesive.

Such compounding of a soft rubber component with polypropylene yields a polypropylene-based adhesive having improved adhesiveness (for example, Patent Literature 1 and Patent Literature 2). On the other hand, the soft rubber component causes whitening during secondary processings such as drawing and bending, and therefore an improvement in whitening resistance has been required. In particular, example of specific applications needed for drawing and bending include packaging materials for food products, construction materials, and packaging materials for lithium ion batteries.

Among these applications, use of the lithium ion batteries has been spread in the fields of portable electronic devices, automobiles, etc. Furthermore, to meet the freedom in shape and a size reduction in lithium ion batteries, use of pouch-type and emboss-type packaging comprising multilayer films has been spread. Such a packaging material comprising a multilayer film comprises at least a substrate layer, a metal foil layer, a thermally sealable resin layer, and an adhesive layer which bonds two adjacent layers among these three layers. Although the multilayer film has high freedom in shape, and therefore is easy to process during production of packages of a pouch-type or emboss-type, the deformed portions of the multilayer film may be whitened during deformation. Because whitened portions of the packaging material cause short circuit, a material having high whitening resistance has been demanded.

Patent Literature 3 describes a packaging material for a battery comprising a laminate of a substrate layer, a metal foil layer including a chemically treated layer on at least one surface thereof, an acid-modified polyolefin layer, and a sealant layer composed of a high melting point polypropylene layer and an ethylene•propylene random copolymer layer, these layers being at least sequentially disposed, wherein the high melting point polypropylene layer is disposed closer to the metal foil layer than the ethylene•propylene random copolymer layer is, and the melting point is 150° C. or more. In the packaging material for a battery, the high melting point polypropylene layer having a melting point of 150° C. or more is disposed closer to the metal foil layer than the ethylene•propylene random copolymer layer is. For this reason, even if the temperature of the inside of a battery is increased by overcharge or the like, the high melting point polypropylene layer does not melt, enabling prevention of the contact between the metal terminal and the metal foil layer and thus generation of internal short circuit.

Unfortunately, sufficient whitening resistance cannot be expected in this packaging material for a battery.

Patent Literature 4 describes a polypropylene resin composition for a battery packaging film comprising a propylene-ethylene block copolymer (A) comprising a propylene polymer component (A1) and a propylene-ethylene random copolymer component (A2), the propylene-ethylene block copolymer (A) being prepared through multi-stage polymerization, the propylene polymer component (A1) and the propylene-ethylene random copolymer component (A2) satisfying specific conditions such as the content of ethylene. According to the description of this patent literature, the film formed of this composition has high heat resistance, sealing performance, and molding properties, has high sealing strength and impact resistance, and has an effect of improving whitening resistance and crack resistance during deformation processing in a good balance. Unfortunately, actually, the required level of whitening resistance has not been achieved yet.

Furthermore, high speed molding becomes mainstream these days to improve productivity. A higher molding speed may result in a reduction in enthalpy to be applied for adhesion, and a sufficient adhesive strength may not be obtained in some cases. For this reason, there is a demand for a sealable resin which provides a good adhesive strength even during molding at high speed.

CITATION LIST

Patent Literature

Patent Literature 1: Japanese Patent Laid-Open No. 9-111069
Patent Literature 2: Japanese Patent Laid-Open No. 4-300933
Patent Literature 3: Japanese Patent Laid-Open No. 2007-273398
Patent Literature 4: Japanese Patent Laid-Open No. 2015-230777

SUMMARY OF INVENTION

Technical Problem

In consideration of such problems, an object of the present invention is to provide a packaging material having high adhesiveness, particularly high adhesiveness at a low enthalpy and high whitening resistance during deformation processing, usable in packaging materials for food products, construction materials, packaging materials for lithium ion batteries and the like, and particularly to provide a packaging material which can be produced by molding methods such as co-extrusion, (co-)extrusion coating and lamination.

Solution to Problem

To achieve the above object, the present invention is a resin composition comprising:
  35 to 59.9 parts by mass of a propylene polymer (A) satisfying the following requirement (a);
  25 to 40 parts by mass of a soft propylene copolymer (B) satisfying the following requirement (b);
  0.1 to 10 parts by mass of a polyolefin (C) containing a structural unit derived from an unsaturated carboxylic acid and/or a derivative thereof; and
  15 to 30 parts by mass of an ethylene polymer (D) satisfying the following requirement (d) (provided that the total of (A), (B), (C), and (D) is 100 parts by mass),
  wherein an MFR measured at 230° C. and a load of 2.16 kg according to ASTM D-1238 is 7 g/10 min or more and 25 g/10 min or less.
  (a) A melting point (Tm) observed by differential scanning calorimetry is 120° C. or more.
  (b) An MFR measured at 230° C. and a load of 2.16 kg according to ASTM D-1238 is in the range of 0.01 to 100 g/10 min, and the following requirements (b-1) and (b-2) are satisfied:
  (b-1) a melting point (Tm) observed by differential scanning calorimetry is 110° C. or less, or no melting point is observed; and
  (b-2) a constitutional unit derived from propylene and a constitutional unit derived from at least one olefin selected from ethylene and α-olefins having 4 to 20 carbon atoms are contained, a content of the constitutional unit derived from at least one α-olefin selected from ethylene and α-olefins having 4 to 20 carbon atoms is 30 mol % or less, and an isotactic triad fraction (mm fraction) measured by $^{13}$C-NMR is 80% or more.
  (d) The ethylene polymer (D) is an ethylene homopolymer or a copolymer of ethylene and at least one α-olefin selected from α-olefins having 3 to 20 carbon atoms, and an MFR measured at 190° C. and a load of 2.16 kg according to ASTM D-1238 is in the range of 0.1 to 10 g/10 min.

In the resin composition, the polyolefin (C) contains 0.01 to 5% by mass of the structural unit derived from the unsaturated carboxylic acid in terms of a structural unit derived from maleic anhydride, and further, in the polyolefin (C), the content proportion of the structural unit derived from the propylene in the structural units excluding the structural unit derived from the unsaturated carboxylic acid is preferably 90 to 100 mol %.

The monolayer film or multilayer film according to the present invention comprises at least one layer comprising the resin composition.

One aspect of the multilayer film according to the present invention can include a multilayer film comprising at least one layer comprising the resin composition, and at least two other layers different from the layer comprising the composition, wherein both surfaces of the layer comprising the composition are in contact with the other layers.

One aspect of the multilayer film according to the present invention can include a multilayer film comprising at least one layer comprising the resin composition and at least one layer selected from a metal containing layer, a polyolefin layer, and a polar resin layer, wherein the layer comprising the composition is in contact with at least one layer of the metal containing layer, the polyolefin layer, and the polar resin layer.

The monolayer film or multilayer film according to the present invention can be used as a film for food packaging, construction materials and battery packaging.

The monolayer film or multilayer film according to the present invention is produced by melt extrusion molding of the above-described resin composition.

Advantageous Effects of Invention

A monolayer film or multilayer film comprising a layer formed of the resin composition according to the present invention has high adhesiveness, particularly high adhesiveness at a low enthalpy, and further has high whitening resistance during deformation processing, and can be suitably used as a packaging material for forming packaging materials for food products, construction materials, packaging materials for lithium ion batteries and the like. Moreover, the monolayer film or multilayer film also exhibits good whitening resistance during deformation processing or deep drawing at high speed. The monolayer film or multilayer film can be produced by molding methods such as co-extrusion, (co-)extrusion coating and lamination.

DESCRIPTION OF EMBODIMENTS

The resin composition according to the present invention comprises a propylene polymer (A), a soft propylene copolymer (B), a polyolefin (C) containing a structural unit derived from an unsaturated carboxylic acid and/or a derivative thereof, and an ethylene polymer (D).

Propylene Polymer (A)

Examples of the propylene polymer (A) can include propylene homopolymers, or copolymers of propylene and at least one α-olefin having 2 to 20 carbon atoms excluding propylene. Here, examples of the α-olefins having 2 to 20 carbon atoms excluding propylene include ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. Preferred is ethylene or α-olefins having 4 to 10 carbon atoms.

The copolymer of propylene and these α-olefins may be random copolymers, or may be block copolymers. The structural units derived from these α-olefins can be contained in a proportion of 35 mol % or less, preferably 30 mol % or less in the copolymer of the α-olefins and propylene.

The propylene polymer (A) satisfies the following requirement (a).
  (a) The melting point (Tm) observed by differential scanning calorimetry is 120° C. or more.

The melting point (Tm) is preferably 120 to 170° C., more preferably 130 to 165° C.

The propylene polymer (A) desirably has a melt flow rate (MFR) in the range of 0.01 to 1000 g/10 min, preferably 0.05 to 100 g/10 min observed at 230° C. and a load of 2.16 kg according to ASTM D 1238.

The propylene polymer (A) may have any of an isotactic structure and a syndiotactic structure. As described later, one of these structures can be selected in consideration of the compatibility with the soft propylene copolymer (B).

In other words, examples of the form of the propylene polymer (A) include an isotactic propylene polymer (A1) and a syndiotactic propylene polymer (A2).

Examples of the isotactic propylene polymer (A1) include homopolypropylenes having high heat resistance, such as homopolypropylenes usually known to contain 3 mol % or less of a copolymerization component other than propylene; polypropylene impact copolymers having a good balance between the heat resistance and the flexibility, such as polypropylene impact copolymers usually known to contain 3 to 30% by mass of a normal decane-elutable rubber component; and random polypropylenes having a good balance between the flexibility and the transparency, such as random polypropylenes known to have a melt peak in the range of 120° C. or more, preferably 130° C. to 150° C. measured with a differential scanning calorimeter DSC. The isotactic propylene polymer (A1) can be appropriately selected from these polypropylene components to attain the target physical properties, or two or more of the polypropylene components having different melting points and different rigidities can be used in combination.

Such an isotactic propylene polymer (A1) can be produced, for example, through polymerization of propylene or copolymerization of propylene and other α-olefin in the presence of a Ziegler catalyst system containing a solid catalyst component containing magnesium, titanium, halogen, and an electron donor as essential components, an organic aluminum compound, and an electron donor or a metallocene catalyst system using a metallocene compound as one component of the catalyst.

The syndiotactic propylene polymer (A2) contains 90 mol % or more of a structural unit derived from propylene, and 10 mol % or less of a structural unit derived from at least one member selected from ethylene and α-olefins having 4 to 20 carbon atoms. The syndiotactic propylene polymer (A2) preferably contains 91 mol % or more of the structural unit derived from propylene, and 9 mol % or less of the structural unit derived from at least one member selected from ethylene and α-olefins having 4 to 20 carbon atoms (provided that a total of these structural units is 100 mol %).

Examples of the α-olefins having 4 to 20 carbon atoms include 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, and 1-eicosene.

The syndiotactic propylene polymer (A2) can be produced by a method described in International Publication No. WO2011/078054, for example.

(B) Soft Propylene Copolymer

The soft propylene copolymer (B) satisfies the following requirement (b):
(b) The MFR measured at 230° C. and a load of 2.16 kg according to ASTM D-1238 is in the range of 0.01 to 100 g/10 min and the following requirements (b-1) and (b-2) are satisfied.
(b-1) A melting point (Tm) is 110° C. or less, or no melting point is observed.
(b-2) A constitutional unit derived from propylene and a constitutional unit derived from at least one olefin selected from ethylene and α-olefins having 4 to 20 carbon atoms are contained, a content of the constitutional unit derived from at least one α-olefin selected from ethylene and α-olefins having 4 to 20 carbon atoms is 30 mol % or less, and an isotactic triad fraction (mm fraction) measured by $^{13}$C-NMR is 80% or more.

Hereinafter, the requirement (b) and others will be described in detail.
Requirement (b)

The soft propylene copolymer (B) has a melt flow rate (MFR; ASTM D-1238, at 230° C. under a load of 2.16 kg) of 0.01 to 100 g/10 min, preferably 0.01 to 30 g/10 min.

In addition, the soft propylene copolymer (B) satisfies the requirements (b-1) and (b-2).

(Requirement (b-1))

A melting point (Tm) observed by differential scanning calorimetry is 110° C. or less, or no melting point is observed. Here, the term "no melting point is observed" indicates that in differential scanning calorimetry, a crystal melting peak having a crystal enthalpy of 1 J/g or more is not observed in the range of −150 to 200° C. The details of the condition for the measurement of the melting point are as described in Examples later.

The melting point (Tm) is preferably 40 to 110° C., more preferably 45 to 108° C. A melting point (Tm) satisfying the conditions above is preferred from the viewpoint of the miscibility with the propylene polymer and transparency.

(Requirement (b-2))

A constitutional unit derived from propylene and a constitutional unit derived from at least one olefin selected from ethylene and α-olefins having 4 to 20 carbon atoms are contained, the content of the constitutional unit derived from at least one α-olefin selected from ethylene and α-olefins having 4 to 20 carbon atoms is 30 mol % or less, and the isotactic triad fraction (mm fraction) measured by $^{13}$C-NMR is 80% or more.

Examples of the α-olefins having 4 to 20 carbon atoms include 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. The at least one olefin selected from ethylene and α-olefins having 4 to 20 carbon atoms is particularly preferably ethylene, 1-butene, 1-hexene, 4-methyl-1-pentene, and 1-octene.

The content of the constitutional unit derived from at least one α-olefin selected from ethylene and α-olefins having 4 to 20 carbon atoms is preferably 5 to 30 mol %, more preferably 7 to 26 mol %.

The isotactic triad fraction (mm) calculated from the measurement by $^{13}$C-NMR is preferably 85% or more. An isotactic triad fraction (mm) in this range is preferred to maintain the mechanical properties and the oil resistance.

(Other Requirements)

The intrinsic viscosity [η] of the soft propylene copolymer (B) measured at 135° C. in decalin is 0.1 to 10 dL/g, preferably 0.5 to 10 dL/g.

The degree of crystallization of the soft propylene copolymer (B) measured by X-ray diffraction is preferably 20% or less, more preferably 0 to 15%.

The soft propylene copolymer (B) has a single glass transition temperature, and the glass transition temperature (Tg) obtained by differential scanning calorimetry (DSC) is in the range of usually −50° C. to 10° C., preferably −40° C. to 0° C., more preferably −35° C. to 0° C. A soft propylene copolymer (B) having a glass transition temperature (Tg) within this range is preferred because it has high cold resistance and low temperature properties and also exhibits stress absorption performance.

Differential scanning calorimetry is performed as follows, for example. A sample (about 10.00 mg) is placed into a dedicated aluminum pan. Using DSCRDC220 made by Seiko Instruments Inc., the aluminum pan is heated from 30° C. to 200° C. at 200° C./min, and is kept at 200° C. for five minutes. The aluminum pan is then cooled from 200° C. to −100° C. at 10° C./min, and is kept at −100° C. for another five minutes, followed by heating at 10° C./min. From the endothermic curve at this time, the glass transition temperature (Tg) is determined.

The molecular weight distribution (Mw/Mn, in terms of polystyrene, Mw: weight average molecular weight, Mn: number average molecular weight) of the soft propylene copolymer (B) measured by GPC is preferably 3.5 or less, more preferably 3.0 or less, more preferably 2.5 or less. The lower limit value is 1.5 or more, for example.

The soft propylene copolymer (B) may be partially grafted with a polar monomer. Examples of the polar monomer include ethylenically unsaturated compounds containing a hydroxyl group, ethylenically unsaturated compounds containing an amino group, ethylenically unsaturated compounds containing an epoxy group, aromatic vinyl compounds, unsaturated carboxylic acids or derivatives thereof, vinyl ester compounds, and vinyl chloride. The grafted soft propylene copolymer (B) is yielded through graft reaction of the soft propylene copolymer (B) described above with the polar monomer. During graft reaction of the soft propylene copolymer (B) described above with the polar monomer, the polar monomer is used in an amount of usually 1 to 100 parts by mass, preferably 5 to 80 parts by mass relative to 100 parts by mass of the soft propylene copolymer (B). This graft reaction is usually performed in the presence of a radical initiator. As the radical initiator, organic peroxide or an azo compound can be used. The radical initiator can be mixed as it is with the soft propylene copolymer (B) and the polar monomer for use, or may be dissolved in a small amount of an organic solvent for use. Any organic solvent that can dissolve the radical initiator can be used without limitation in particular. During graft polymerization of the soft propylene copolymer (B) described above with the polar monomer, a reducing substance may be used. Use of the reducing substance can improve the graft amount of the polar monomer.

The graft modification of the soft propylene copolymer (B) with the polar monomer can be performed by a method conventionally known, for example, by dissolving the soft propylene copolymer (B) in an organic solvent, and then adding a polar monomer and a radical initiator to the solution to react these materials at a temperature of 70 to 200° C., preferably 80 to 190° C. for 0.5 to 15 hours, preferably 1 to 10 hours. Alternatively, using an extruder, the soft propylene copolymer (B) can be reacted with a polar monomer in the absence of a solvent to produce a modified soft propylene copolymer (B). This reaction is desirably performed at a temperature usually equal to or higher than the melting point of the soft propylene copolymer (B), specifically 120 to 250° C., usually 0.5 to 10 minutes.

The modification amount of the modified soft propylene copolymer thus yielded (graft amount of the polar monomer) is desirably usually 0.1 to 50% by mass, preferably 0.2 to 30% by mass, more preferably 0.2 to 10% by mass.

If the propylene polymer composition according to the present invention contains the modified soft propylene copolymer described above, the propylene polymer composition may have high adhesiveness to and miscibility with other resins to improve the wettability of the surfaces of molded products.

The propylene•α-olefin random copolymer (B) can be produced by a method described in International Publication No. WO2004/087775 pamphlet, for example.

Examples of preferred forms of the soft propylene copolymer (B) can include a propylen•butene copolymer (B1) and a propylene•ethylene copolymer (B2) below.

The propylene•butene copolymer (B1) contains 70 to 95 mol %, preferably 70 to 89 mol % of the structural unit derived from propylene in the soft propylene copolymer (B) described above.

The propylene•butene copolymer (B1) having such a composition has good compatibility with the propylene polymer (A).

The propylene•ethylene copolymer (B2) contains 70 to 95 mol %, preferably 70 to 93 mol % of the structural unit derived from propylene in the soft propylene copolymer (B) described above.

Polyolefin (C) Containing Structural Unit Derived from an Unsaturated Carboxylic Acid and/or a Derivative Thereof The polyolefin (C) is yielded through modification of polyolefin with an unsaturated carboxylic acid and/or a derivative thereof, and contains the structural unit derived from the unsaturated carboxylic acid and/or the derivative thereof.

Examples of the polyolefin to be modified can include polypropylene (c1), ethylene•propylene•α-olefin copolymer (c2), and ethylene•α-olefin copolymer (c3).

These polyolefins (C) may be used singly or as a mixture thereof. For example, the polyolefin (C) may be one of modified products of the polypropylene (c1), modified products of the ethylene•propylene•α-olefin copolymer (c2), and modified products of the ethylene•α-olefin copolymer (c3), or may be a mixture thereof.

The polypropylene (c1) may be a homopolymer of propylene and/or a propylene•α-olefin copolymer, for example. Examples of the α-olefin include, but should not be limited to, preferably ethylene and α-olefins having 4 to 20 carbon atoms. These α-olefins may be used singly or in combinations of two or more. Preferred α-olefins are ethylene and α-olefins having 4 to 10 carbon atoms. Among these, particularly suitable are ethylene and α-olefins having 4 to 8 carbon atoms. Here, the content of the structural unit derived from propylene in the propylene•α-olefin copolymer is at least 50 mol % or more and less than 100%.

The polypropylene (c1) preferably has an intrinsic viscosity [η] of 0.1 to 10 dl/g. An intrinsic viscosity [η] in this range can attain a composition having high molding properties and mechanical strength.

Examples of the method of producing the polypropylene (c1) include, but should not be particularly limited to, a known method in the presence of a known catalyst such as a Ziegler-Natta catalyst or a metallocene catalyst.

The polypropylene (c1) is preferably a crystalline polymer. If the polypropylene (c1) is a copolymer, it may be a random copolymer or may be a propylene impact copolymer. Furthermore, the polypropylene (c1) may have any stereoregularity and any molecular weight without limitation as long as it satisfies the molding properties and has sufficient strength when molded products thereof are produced. A commercially available resin can also be used as it is.

The polypropylene (c1) is a homopolypropylene or a propylene•α-olefin random copolymer, for example. The polypropylene (c1) may also contain several different isotactic polypropylenes.

The ethylene•propylene•α-olefin copolymer (c2) is specified by the following requirements (i) and (ii), for example:

(i) The structural unit derived from propylene is contained at 45 to 90 mol %, the structural unit derived from ethylene is contained at 10 to 25 mol %, and the structural unit derived from an α-olefin having 4 to 20 carbon atoms is contained at 1 to 30 mol %; and (ii) The intrinsic viscosity [η] at 135° C. in decalin is in the range of 0.1 to 10 dl/g.

As the α-olefin, α-olefins having 4 to 10 carbon atoms can be suitably used. These α-olefins having 4 to 10 carbon atoms may be used singly or in combinations or two or more. The proportions of the structural units derived from the monomers propylene, ethylene, and α-olefin are preferably 50 to 85 mol %, 10 to 22 mol %, and 5 to 28 mol %, respectively. The proportions thereof are more preferably 55 to 80 mol %, 10 to 20 mol %, and 10 to 28 mol %, respectively.

In the requirement (ii), the intrinsic viscosity [η] is in the range of more preferably 0.5 to 8, still more preferably 0.8 to 6. An intrinsic viscosity [η] in this range can attain an adhesive having a good balance between the flexibility and the mechanical strength and having high adhesive strength.

The ethylene•propylene•α-olefin copolymer (C2) can be produced by any known method in the presence of a known catalyst such as a Ziegler-Natta catalyst or a metallocene catalyst.

The ethylene•propylene•α-olefin copolymer (C2) can have any stereoregularity and any molecular weight as long as it satisfies the molding properties and has sufficient strength when molded articles are produced. A commercially available resin can also be used as it is.

The ethylene•α-olefin copolymer (c3) is specified by the following requirements (iii) and (iv):
(iii) The structural unit derived from ethylene is contained at 50 to 99 mol % and the structural unit derived from α-olefin having 3 to 20 carbon atoms is contained at 1 to 50 mol %.
(iv) The intrinsic viscosity [η] at 135° C. in decalin is in the range of 0.1 to 10 dl/g.

As the α-olefin, α-olefins having 3 to 10 carbon atoms are more suitable. These α-olefins having 3 to 10 carbon atoms may be used singly or in combinations of two or more. The proportions of the structural units derived from the monomers ethylene and α-olefin are preferably 55 to 98 mol % and 2 to 45 mol %, respectively, more preferably 60 to 95 mol % and 5 to 40 mol %, respectively.

In the requirement (iv), the intrinsic viscosity [η] is in the range of more preferably 0.5 to 8, still more preferably, 0.8 to 6. An intrinsic viscosity [η] in this range can attain a composition having a good balance between the flexibility and the mechanical strength and having high adhesive strength.

Examples of the method of producing ethylene•α-olefin copolymer (c3) include, but should not be particularly limited to, a known method in the presence of a known catalyst such as a Ziegler-Natta catalyst or a metallocene catalyst.

The ethylene•α-olefin copolymer (c3) can have any stereoregularity and any molecular weight as long as it satisfies the molding properties and has sufficient strength during production of molded articles. A commercially available resin can also be used as it is for the ethylene•α-olefin copolymer (c3).

Examples of the unsaturated carboxylic acids and/or derivatives thereof used for modification of these polyolefins can include unsaturated compounds having one or more carboxylic groups, esters of compounds having a carboxylic group and alkyl alcohols, and unsaturated compounds having one or more anhydrous carboxylic group. Examples of the unsaturated groups contained in the unsaturated compounds can include a vinyl group, a vinylene group, and an unsaturated cyclic hydrocarbon group. These unsaturated carboxylic acids and/or derivatives thereof can be used singly or in combinations of two or more. Among these, suitable are unsaturated dicarboxylic acids or acid anhydrides thereof, and particularly preferred are maleic acid, nadic acid, or acid anhydrides thereof.

The content of the structural unit derived from an unsaturated carboxylic acid and/or a derivative thereof contained in the polyolefin (C) is preferably 0.01 to 5% by mass, more preferably 0.05 to 3.5% by mass in terms of the structural unit derived from maleic anhydride. A content of the structural unit derived from an unsaturated carboxylic acid and/or a derivative thereof in this range can provide a resin composition having a good balance between the molding properties and the adhesiveness.

In the polyolefin (C), the content proportion of the structural unit derived from propylene in the structural units of the polyolefin (C) excluding the structural unit derived from an unsaturated carboxylic acid and/or a derivative thereof is preferably 90 to 100 mol %, more preferably 95 to 100 mol %. A content proportion of the structural unit derived from propylene in this range can provide a resin composition having a heat resistance.

The unsaturated carboxylic acid and/or a derivative thereof can be grafted by any method, and a conventionally known graft reaction method such as a solution method or a melt kneading method can be used without limitation in particular. Examples thereof include a method of melting polyolefin, adding an unsaturated carboxylic acid and/or a derivative thereof thereto to perform a graft reaction; or a method of dissolving polyolefin in a solvent to prepare a solution, and adding an unsaturated carboxylic acid and/or a derivative thereof to perform a graft reaction.

Ethylene Polymer (D)

The ethylene polymer (D) used in the present invention is an ethylene homopolymer or a copolymer of ethylene and at least one α-olefin selected from α-olefins having 3 to 20 carbon atoms. The ethylene homopolymer and ethylene•α-olefin copolymer specified by the following requirement (i) can be used. As the copolymer, preferred is an ethylene•α-olefin copolymer specified by the following requirement (ii).
  (i) The MFR measured at 190° C. and a load of 2.16 kg according to ASTM D-1238 is in the range of 0.1 to 10 g/10 min.
  (ii) The constitutional unit derived from ethylene is contained at 50 to 99 mol %, and the constitutional unit derived from an α-olefin selected from α-olefins having 3 to 20 carbon atoms is contained at 1 to 50 mol %.

For the copolymer, α-olefins having 3 to 10 carbon atoms can be suitably used as the α-olefin, and those having carbon atoms in this range may be used singly or in combinations of two or more. The proportions of the monomer components, ethylene and α-olefin, are preferably 55 to 98 mol % and 2 to 45 mol %, more preferably 60 to 95 mol % and 5 to 40 mol %, respectively.

In the requirement (i), the MFR is in the range of preferably 0.5 to 8 g/10 min, more preferably 1 to 6 g/10 min. An MFR in this range can attain an adhesive having a good balance between flexibility and the mechanical strength and having high adhesive strength.

The ethylene polymer (D) can be produced by a known method such as a high pressure method or a method in the presence of a known catalyst such as a Ziegler-Natta catalyst or a metallocene catalyst, but the method should not be particularly limited thereto. Furthermore, the ethylene polymer (D) may have any stereoregularity and any molecular weight without limitation as long as it satisfies the molding properties and has sufficient strength in use when molded products thereof are produced. A commercially available resin can also be used as it is. The ethylene polymer (D) may be an ethylene polymer including a small amount of maleic anhydride or the like grafted thereto as long as the conditions above are satisfied. The ethylene polymer (D) may be an ethylene polymer prepared by grafting a small amount of maleic anhydride or the like, and then, further modifying the graft monomer with diamine, carbodiimide or the like, as long as the conditions above are satisfied.

Other Components

The resin composition according to the present invention may appropriately contain other components such as propylene-ethylene block copolymers, propylene homopolymers, propylene-ethylene random copolymers, propylene-ethylene-butene random copolymers, styrene elastomers, and polyethylenes having different compositions from that of the present invention in the range not impairing the advantageous effects of the present invention. The proportions of the other components in the resin composition according to the present invention are preferably 20% by mass or less.

Besides, the resin composition according to the present invention may contain known additives such as antioxidants, ultraviolet absorbing agents, neutralizers, nucleating agents, light stabilizers, antistatic agents, anti-blocking agents, lubricants, odor adsorbents, antibacterial agents, pigments, inorganic and organic fillers, and a variety of synthetic resins when necessary.

Resin Composition

The resin composition according to the present invention can be produced by a known conventional method. For example, the components described above can be melt kneaded to produce the resin composition.

The contents of the propylene polymer (A), the soft propylene copolymer (B), the polyolefin (C), and the ethylene polymer (D) in the resin composition according to the present invention are preferably 35 to 59.9 parts by mass, 25 to 40 parts by mass, 0.1 to 10 parts by mass, and 15 to 30 parts by mass, and more preferably 35 to 55 parts by mass, 25 to 35 parts by mass, 1 to 7 parts by mass, and 20 to 30 parts by mass, respectively, relative to 100 parts by mass of the total content of the propylene polymer (A), the soft propylene copolymer (B), the polyolefin (C), and the ethylene polymer (D). If the resin composition according to the present invention contains the components described above in amounts in this range, high adhesiveness, particularly high adhesiveness at a low enthalpy is provided. Moreover, a film comprising a layer formed of this composition is more barely whitened during deformation processing.

The resin composition according to the present invention has an MFR measured at 230° C. and a load of 2.16 kg according to ASTM D-1238 of 7 g/10 min or more and 25 g/10 min or less, preferably 8 g/10 min or more and 15 g/10 min or less. An MFR in this range can facilitate relaxation of orientation of molecular chains even if the film is molded under a high speed molding condition, and can reduce whitening during deformation processing subsequent thereto.

Whitening during deformation processing occurs when fine cracks are generated. It is believed that fine cracks generated in the film will reduce insulation when the film is formed into a battery packaging material.

Monolayer Film or Multilayer Film

The monolayer film and the multilayer film according to the present invention is a monolayer film or a multilayer film comprising at least one layer comprising the resin composition. In other words, the monolayer film according to the present invention is a film composed of a layer comprising the resin composition, and the multilayer film is a multilayer film comprising at least one layer comprising the resin composition.

The monolayer film and the multilayer film according to the present invention have high whitening resistance during deformation processing. Accordingly, if the monolayer film and the multilayer film according to the present invention are used as packaging materials for food products, construction materials, and packaging materials for lithium ion batteries, these films are barely whitened during secondary processing (such as drawing or bending) of the films. For this reason, the monolayer film and the multilayer film according to the present invention can be suitably used as packaging materials for food products, construction materials, and films for battery packaging.

In particular, although polypropylene resins have been used as a packaging material for lithium ion batteries, the present invention has implemented the prevention of whitening of the packaging material, which has not been prevented by the conventional polypropylene resins, by use of a specific combination comprising the propylene polymer (A), the soft propylene copolymer (B), the polyolefin (C), and the ethylene polymer (D) described above.

The multilayer film according to the present invention comprises at least one layer comprising the resin composition, and further one or both surfaces of the layer comprising the composition are in contact with (a) different layer(s) contained in the multilayer film. Examples of the different layer in contact with the layer comprising the composition can include metal containing layers, polyolefin layers, and polar resin layers. Examples of the metal containing layer can include aluminum layers, copper layers, and stainless steel layers. Examples of the polyolefin layer can include polypropylene layers, poly-4-methylpentene layers, and polyethylene layer. Examples of the polar resin layer can include polyamide layers, EVOH layers, PET layers, and PBT layers.

The monolayer film and the multilayer film according to the present invention can be prepared through melt extrusion molding, and can be generally produced by a method industrially used, such as casting, blown, or extrusion coating.

EXAMPLES

Hereinafter, the present invention will be more specifically described by way of Examples and Comparative Examples, but these Examples should not be construed as any limitation to the present invention without departing the gist of the present invention.

(Methods for Measurement)

In Examples, measurements were performed according to the following methods.

[Melt Flow Rate (MFR)]

The melt flow rate was measured at 230° C. under a load of 2.16 kg according to ASTM D1238.

[Intrinsic Viscosity [η]]

The intrinsic viscosity [η] was measured according to ASTM D1601.

[Evaluation of Whitening Resistance after Drawing]

DRAWING

Multilayer films (polypropylene layer/adhesive layer/aluminum layer) for evaluation of whitening resistance during normal molding and high speed molding prepared in Examples and Comparative Examples were drawn at a rate of 200 mm/min using a metal mold having an intermeshing depth of 5 mm. The degree of whitening generated on wall surfaces of the resulting molded articles was visually evaluated according to the following criteria:

A: No whitening
B: Slightly whitened
C: Remarkably whitened

[Adhesive Strength]

Multilayer films for measurement of adhesive strength (aluminum layer/adhesive layer/aluminum layer) prepared in Examples and Comparative Examples were cut into a width of 20 mm, and the adhesive strength (unit: N/20 mm) between the aluminum layer and the adhesive layer was measured at room temperature (23° C.) using a tensile tester by a 180° peeling method. The crosshead speed was 200 mm/min.

[Polymer Composition]

The contents of structural unit derived from propylene and the structural unit derived from α-olefin in the propylene copolymer were measured by $^{13}$C-NMR using the following apparatus on the following conditions.

The contents of the propylene and the α-olefin were quantitated and the isotactic triad fraction (mm fraction) was measured using a JECX400P nuclear magnetic resonance apparatus made by JEOL, Ltd. Measurement was performed using a mixed solvent of ortho-dichlorobenzene-d6/benzene-d6 (80/20 volume %) as a solvent (sample content: 60 mg/0.6 mL, measurement temperature of 120° C., observation nuclear: $^{13}$C (100 MHz), sequence: single pulse proton decoupling, pulse width: 4.62 μs (45° pulse), repetition time: 5.5 seconds, the number of accumulation: 8000 times, reference value of the chemical shift: 29.73 ppm).

[Melting Point (Tm), Glass Transition Temperature (Tg)]

The melting point (Tm) and the glass transition temperature (Tg) were measured with a DSC220C apparatus made by Seiko Instruments Inc. as a differential scanning calorimeter (DSC). A sample (5 to 10 mg) was sealed in an aluminum pan, which was used as a sample. In the temperature profile, the sample was heated from room temperature to 230° C. at 50° C./min, and was kept at 230° C. for five minutes. The sample was then cooled to −80° C. at 10° C./min, and was kept at −80° C. for five minutes, followed by further heating to 230° C. at 10° C./min. From the chart during the second heating operation, the melting point (Tm) and the glass transition temperature (Tg) were obtained.

[Molecular Weight (Mn, Mw), Molecular Weight Distribution (Mw/Mn)]

The molecular weight and molecular weight distribution of the polymer were measured with a liquid chromatograph (made by Alliance/GPC2000 made by TA Instruments-Waters LLC) including two TSKgelGMH6-HT columns and two TSKgelGMH6-HTL columns (made by Tosoh Corporation, both having a column size having a diameter of 7.5 mm and a length of 300 mm) connected in series. The mobile phase medium used was o-dichlorobenzene and the antioxidant used was BHT (Takeda Pharmaceutical Company Limited, 0.025% by mass). The measurement was performed at a sample content of 0.15% (V/W), a flow rate of 1.0 mL/min, and 140° C. Standard polystyrenes having molecular weights of 500 to 20,600,000 made by Tosoh Corporation were used. The obtained chromatogram was analyzed with data processing software Empower2 made by TA Instruments-Waters LLC according to a known method from a calibration curve using standard polystyrene samples to calculate Mn, Mw, and Mw/Mn.

(Polyolefins Used)

The polyolefins used in Examples and Comparative Examples are shown below. Unless otherwise specified, all of the polyolefins were prepared through polymerization according to a normal method.

Propylene Polymer (A)

PP-1: random polypropylene
(propylene: 96 mol %, ethylene: 4 mol %, Tm: 140° C.)

Soft Propylene Copolymer (B)
  PR-1: propylene•α-olefin copolymer synthesized in Synthetic Example 1 below
(structural unit derived from 1-butene: 26 mol %, structural unit derived from propylene: 74 mol %)
  PR-2: propylene•α-olefin copolymer synthesized in Synthetic Example 2 below
(structural unit derived from ethylene: 14 mol %, structural unit derived from propylene: 86 mol %)

Polyolefin (C)
  modified PP-1: modified homopolypropylene
(maleic anhydride graft amount: 3.0% by mass, [ii]: 0.4)

Ethylene polymer (D)
  EPR: ethylene•propylene copolymer
(structural unit derived from ethylene: 80 mol %, structural unit derived from propylene: 20 mol %, MFR: 3.0 g/10 min)
  PE: low density polyethylene
(MFR: 2.8 g/10 min, density: 0.92 g/cm$^3$)

Synthetic Example 1

[Synthesis of Propylene•α-Olefin Copolymer (PR-1)]

Dry hexane (8.7 L), 1-butene (900 g), and triisobutylaluminum (1.0 mmol) were placed into a 20 L polymerization apparatus sufficiently purged with nitrogen at normal temperature, and the inner temperature of the polymerization apparatus was raised to 65° C., and was pressurized with propylene to 0.7 MPa. In the next step, a toluene solution in which dimethylmethylene(3-tert-butyl-5-methylcyclopentadienyl)fluorenylzirconium dichloride (0.002 mmol) and methylaluminoxane (0.6 mmol in terms of aluminum) (made by Tosoh Finechem Corporation) were contacted was added to the polymerization apparatus, and was polymerized for 30 minutes while the inner temperature was kept at 65° C. and the propylene pressure was kept at 0.7 MPa. Then, methanol (20 mL) was added to stop polymerization.

After depressurization, a polymer (propylene•α-olefin copolymer (PR-1)) from the polymerization solution was precipitated in 20 L of methanol, and was vacuum dried at 130° C. for 12 hours.

In propylene•α-olefin copolymer (PR-1), the mass was 130 g, the propylene content was 74 mol %, the butene content was 26 mol %, the melting point (Tm) was 75° C., the MFR (temperature: 230° C., load: 2.16 kg) was 7 g/10 min, the molecular weight distribution (Mw/Mn) was 2.1, and the isotactic triad fraction (mm fraction) was 93%. The above operation was repeated to yield a necessary amount of polymer.

Synthetic Example 2

[Synthesis of Propylene•α-Olefin Copolymer (PR-2)]

Synthesis was performed by the same method as in Synthetic Example 1 except that 1-butene was replaced with ethylene. Thereby, a propylene•ethylene copolymer (propylene•α-olefin copolymer (PR-2)) was yielded.

In propylene•α-olefin copolymer (PR-2), the propylene content was 86 mol %, the ethylene content was 14 mol %, the melting point (Tm) was 80° C., the MFR (temperature: 230° C., load: 2.16 kg) was 8 g/10 min, the molecular weight distribution (Mw/Mn) was 2.2, and the isotactic triad fraction (mm fraction) was 88%.

Example 1

PP-1 (40 parts by mass), PR-1 (30 parts by mass), modified PP-1 (5 parts by mass), EPR (15 parts by mass), and PE (10 parts by mass) were melt kneaded at 230° C. using a single screw extruder to prepare a resin composition. This composition was defined as Adhesive 1.

A commercially available polypropylene (F329RA made by Prime Polymer Co., Ltd., MFR: 24) and Adhesive 1 were co-extruded at 290° C. with a screw having a diameter of 50 mm and an effective length L/D of 28. The extruded polypropylene and the adhesive were laminated in a feed block such that polypropylene formed an outer layer and the adhesive formed an inner layer, to prepare a laminate (thickness: 40 μm) in the form of a film including the outer layer and the inner layer both having a thickness of 20 μm. The die temperature was 290° C. The melt laminate was brought into contact with the surface of an aluminum foil (thickness: 20 μm), and was drawn at a rate of 50 m/min while being cooled with a chill roll with a pinch roll. A multilayer film (polypropylene layer/adhesive layer/aluminum layer) for evaluation of whitening resistance in normal molding was thereby prepared. Similarly, the laminate was drawn at a rate of 100 m/min to prepare a multilayer film (polypropylene layer/adhesive layer/aluminum layer) for evaluation of whitening resistance in high speed molding.

A film having a thickness of 50 μm was molded from Adhesive 1 with an extrusion molding machine having a T-die. The resulting film was sandwiched between two aluminum foils having a thickness of 300 μm, and was heat sealed with a heat sealer at 160° C. and 0.1 MPa for 5 seconds to prepare a multilayer film (aluminum layer/adhesive layer/aluminum layer) for evaluation of adhesive strength in adhesion at a low enthalpy. Similarly, heat sealing was performed at 180° C. and 0.1 MPa for 5 seconds to prepare a multilayer film (aluminum layer/adhesive layer/aluminum layer) for evaluation of adhesive strength in normal adhesion.

Examples 2 to 4, Comparative Examples 1 to 3

In Examples 2 to 4 and Comparative Examples 1 to 3, resin compositions were prepared by the same method as in Example 1 according to the compounding formulas shown in Table 1. The composition prepared in Example 2 was defined as Adhesive 2, the composition prepared in Example 3 was defined as Adhesive 3, the composition prepared in Example 4 was defined as Adhesive 4, the composition prepared in Comparative Example 1 was defined as Adhesive 5, the composition prepared in Comparative Example 2 was defined as Adhesive 6, and the composition prepared in Comparative Example 3 was defined as Adhesive 7. Multilayer films for evaluation of whitening resistance and multilayer films for evaluation of adhesive strength were prepared using the adhesives as in Example 1.

The MFRs of the adhesives prepared in Examples and Comparative Examples, and the evaluation of the adhesive strength and the whitening resistance of the multilayer films prepared from the adhesives are shown in Table 1.

TABLE 1

| | | Example 1 Adhesive 1 | Example 2 Adhesive 2 | Example 3 Adhesive 3 | Example 4 Adhesive 4 | Comparative Example 1 Adhesive 5 | Comparative Example 2 Adhesive 6 | Comparative Example 3 Adhesive 7 |
|---|---|---|---|---|---|---|---|---|
| Compounding (part by mass) | PP | 40 | 45 | 40 | 45 | 70 | 50 | 50 |
| | PR-1 | 30 | 25 | | | | 20 | |
| | PR-2 | | | 30 | 25 | | | 20 |
| | EPR | 15 | 15 | 15 | 15 | 15 | 15 | 15 |
| | PE | 10 | 10 | 10 | 10 | 10 | 10 | 10 |
| | Modified PP-1 | 5 | 5 | 5 | 5 | 5 | 5 | 5 |
| MFR | g/10 min | 11 | 10 | 11 | 11 | 10 | 11 | 10 |
| Adhesive strength at low enthalpy (160° C. × 5 s) | N/20 mm | 112 | 108 | 120 | 113 | 82 | 84 | 89 |
| Adhesive strength in normal molding (180° C. × 5 s) | N/20 mm | 130 | 133 | 139 | 137 | 105 | 117 | 121 |
| Whitening resistance in normal molding | | A | A | A | A | C | B | B |
| Whitening resistance in high speed molding | | A | A | A | A | C | C | C |

The invention claimed is:

1. A resin composition comprising:
   35 to 59.9 parts by mass of a propylene polymer (A) satisfying the following requirement (a);
   25 to 40 parts by mass of a soft propylene copolymer (B) satisfying the following requirement (b) and wherein the soft propylene copolymer (B) is not grafted with a polar monomer;
   0.1 to 10 parts by mass of a polyolefin (C) containing a structural unit derived from an unsaturated carboxylic acid and/or a derivative thereof; and
   15 to 30 parts by mass of an ethylene polymer (D) satisfying the following requirement (d) (provided that the total of (A), (B), (C), and (D) is 100 parts by mass),
   wherein an MFR measured at 230° C. and a load of 2.16 kg according to ASTM D-1238 is 7 g/10 min or more and 25 g/10 min or less,
   (a) a melting point (Tm) observed by differential scanning calorimetry is 120° C. or more,
   (b) an MFR measured at 230° C. and a load of 2.16 kg according to ASTM D-1238 is in the range of 0.01 to 100 g/10 min, and the following requirements (b-1) and (b-2) are satisfied:

(b-1) a melting point (Tm) observed by differential scanning calorimetry is 110° C. or less, or no melting point is observed; and (b-2) a constitutional unit derived from propylene and a constitutional unit derived from at least one olefin selected from ethylene and α-olefins having 4 to 20 carbon atoms are contained, a content of the constitutional unit derived from at least one α-olefin selected from ethylene and α-olefins having 4 to 20 carbon atoms is 30 mol % or less, and an isotactic triad fraction (mm fraction) measured by 13C-NMR is 80% or more, and (d) the ethylene polymer (D) is an ethylene homopolymer or a copolymer of ethylene and at least one α-olefin selected from α-olefins having 3 to 20 carbon atoms, and an MFR measured at 190° C. and a load of 2.16 kg according to ASTM D-1238 is in the range of 0.1 to 10 g/10 min, wherein the polyolefin (C) contains 0.01 to 5% by mass of the structural unit derived from an unsaturated carboxylic acid and/or a derivative thereof in terms of a structural unit derived from maleic anhydride, and wherein in the polyolefin (C), a content proportion of the structural unit derived from propylene in the structural units excluding the structural unit derived from an unsaturated carboxylic acid and/or a derivative thereof is 90 to 100 mol %.

2. A monolayer film or a multilayer film, comprising at least one layer comprising the resin composition according to claim 1.

3. A multilayer film, comprising at least one layer comprising the resin composition according to claim 1 and at least two other layers different from the layer comprising the composition, wherein both surfaces of the layer comprising the composition are in contact with the other layers.

4. A multilayer film, comprising at least one layer comprising the resin composition according to claim 1 and at least one layer selected from a metal containing layer, a polyolefin layer, and a polar resin layer, wherein the layer comprising the composition is in contact with the at least one layer of the metal containing layer, the polyolefin layer, and the polar resin layer.

5. The monolayer film or multilayer film according to claim 2, wherein the film is a film for food packaging.

6. The monolayer film or multilayer film according to claim 2, wherein the film is a film for a construction material.

7. The monolayer film or multilayer film according to claim 2, wherein the film is a film for battery packaging.

8. A method of producing a monolayer film or multilayer film, comprising melt extrusion molding the resin composition according to claim 1.

* * * * *